Oct. 23, 1923.
P. MATHER
RELIEF VALVE FOR TANKS OR RECEPTACLES
Filed July 26, 1920
1,471,855
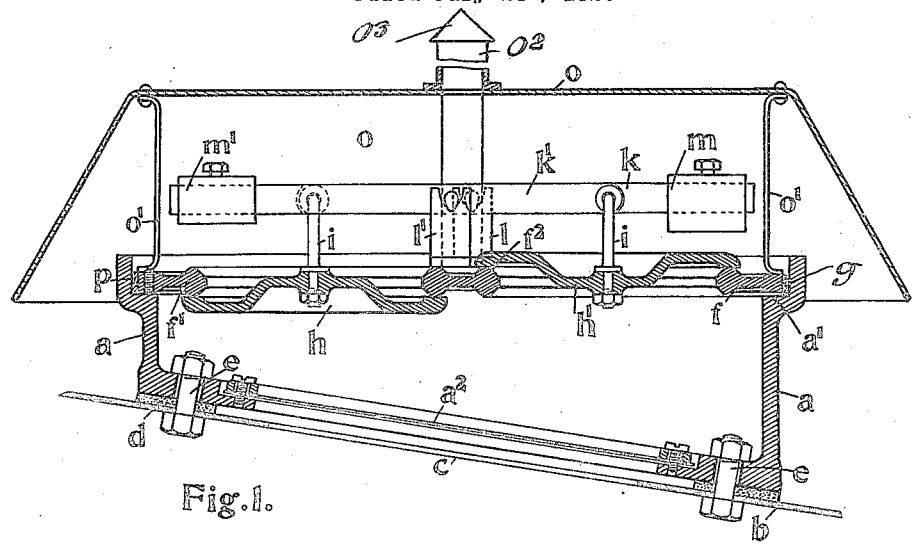
Fig.1.
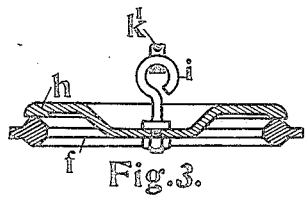
Fig.3.
Fig.2.
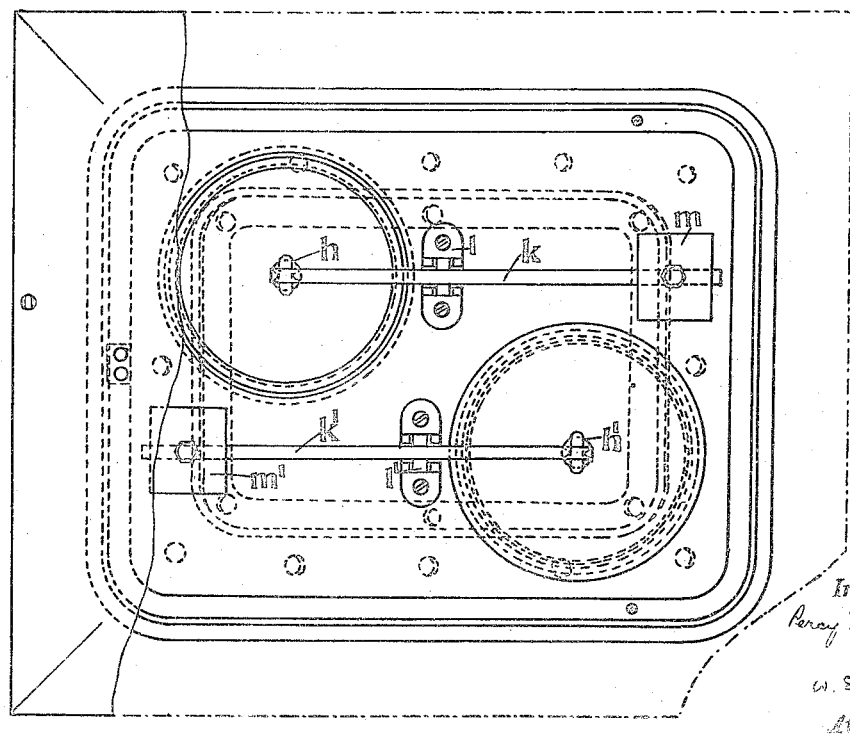
Inventor
Percy Mather
by
W. E. Evans
Attorney.

Patented Oct. 23, 1923.

1,471,855

UNITED STATES PATENT OFFICE.

PERCY MATHER, OF LONDON, ENGLAND.

RELIEF VALVE FOR TANKS OR RECEPTACLES.

Application filed July 26, 1920. Serial No. 399,151.

*To all whom it may concern:*

Be it known that I, PERCY MATHER, a subject of the King of Great Britain and Ireland, residing at 23 Great Winchester Street, London, E. C. 2, England, have invented certain new and useful Improvements in or relating to Relief Valves for Tanks or Receptacles, of which the following is a specification.

This invention relates to tanks or receptacles used for the storage of volatile liquids and for other similar purposes.

According to the invention the pressure and vacuum valves are seated one beneath and the other above the valve seating plate and each valve is suspended from the arm of a lever, the other arm of which carries a counter-weight.

The invention comprises the features which are hereinafter described.

The invention is illustrated in the accompanying drawing in which

Figure 1 is an elevation of the casing and cover of a pair of vacuum and pressure valves constructed and arranged according to the invention, in which the casing, the valves, the valve seating plate and the removable cowl are shewn in section.

Figure 2 is a plan.

Figure 3 is a transverse section through one of the valves.

In carrying the invention into effect as illustrated in the accompanying drawings, I mount a rectangular casing such as $a$ in position upon the tank or receptacle $b$ at a position where a hole $c$ of a corresponding form has been provided in the wall of the tank or receptacle, a layer $d$ of asbestos sheeting being interposed between the bottom face of the casing $a$ and the tank or receptacle, and the valve casing secured in position by such means as bolts $e$. The upper part of the casing $a$ is provided with a shoulder $a^1$ for the reception of a valve seating plate $f$ and asbestos cord or any other suitable packing $g$ is interposed between the edge of the valve seating plate and the wall of the casing $a$.

The valve seating plate $f$ is provided with circular ridges $f^1$ $f^2$ for the reception of the seats of disc valves $h$ and $h^1$, the valve $h$ being disposed beneath the valve seating plate $f$ and being thus adapted to act as a vacuum valve, while the valve $h^1$ is mounted above the valve seating plate $f$ and is adapted to act as a pressure valve.

The respective valves $h$ $h^1$ have hook fittings $i$ mounted centrally thereof for the connection of the valves with the respective valve levers $k$ $k^1$. The valve levers $k$ $k^1$ are mounted upon knife edges on bearings $l^1$ $l$, and on the respective ends opposite to that to which the valves are connected the levers have mounted upon them counter-weights $m$ $m^1$, and these counter-weights are adapted to be moved to apply a determined pressure upon the valve seats. Upon the valve casing $a$ a removable cowl or head $o$ is mounted, supported at a position near the edge of the valve seating plate by feet or pillars $o^1$.

It will be understood that the weights $m$ $m^1$ may be adjusted upon their respective levers so that the valves may be applied upon their seats with a particular degree of pressure and so that thus should a vacuum be produced within the tank or receptacle, the valve $h$ would open under atmospheric pressure and admit air to restore the pressure, while if too great a pressure is created within the tank or receptacle the pressure valve $h^1$ would open for its relief.

Thus in such an arrangement under normal pressure conditions the respective valves would always be closed upon their seats, while on these conditions being substantially altered, one or other of the valves would immediately open to restore the pressure conditions.

It will be understood that the invention is broadly applicable for the maintenance of a predetermined pressure in the manner hereinbefore described. It will be understood, moreover, that by such an arrangement, the cowl or cover $o$ may be readily removed for the inspection of the valves and that the valve seating plate as well as the valves may be also readily removed for adjustment, while the contents of the tank are protected by the gauze screen $a^2$.

It will be understood that the valve casing may be of any shape, but is so disposed that the valve seating plate $f$ shall take a substantially horizontal position, and with a view to ensure the precise adjustment of the valve seating plate $f$ into its horizontal position, adjusting screws such as $p$ may be provided near the edge of the plate $f$. More than one gauze screen may be applied if desired.

With a view to prevent a fall of snow acting as a seal between the cover $o$ and the casing $a$, a ventilating pipe $o^2$ may be mounted upon the cover $o$, and the pipe may be surmounted by a cover $o^3$ which while preventing the inward passage of rain or snow allows of effective ventilation. Any other suitable means may, however, be employed for the same purpose.

I claim:

1. In tanks or receptacles for the reception of volatile liquids, in combination a vacuum relief valve and a pressure relief valve, a valve seating plate upon which the respective valves are adapted to be seated, the vacuum relief valve being beneath the said plate and the pressure relief valve above the said plate, and counter-weighted levers from one arm of which the vacuum and pressure relief valves are respectively suspended, substantially as described.

2. In tanks or receptacles for the reception of volatile liquids, in combination a vacuum relief valve and a pressure relief valve, a valve seating plate upon which the respective valves are adapted to be seated, the vacuum relief valve being beneath the said plate and the pressure relief valve above the said plate, levers carried upon the valve seating plate, from one arm of which levers the respective vacuum and pressure relief valves are respectively suspended, and an adjustable counter-weight carried by the other arm of the said levers, substantially as described.

3. In tanks or receptacles for the reception of volatile liquids, in combination a vacuum relief valve and a pressure relief valve, a valve seating plate upon which the respective valves are adapted to be seated, the vacuum relief valve being beneath said plate and the pressure relief valve being above the said plate, counter-weighted levers from one arm of which the vacuum and pressure relief valves are respectively suspended, a casing in communication with the tank or receptacle and carrying the said valve seating plate in position upon the tank of receptacle, and means for precise adjustment of the valve seating plate in a substantially horizontal position upon the said casing substantially as described.

4. In tanks or receptacles for the reception of volatile liquids, a casing having vertical walls and adapted to surround an opening in the tank or receptacle, and provided at the top with an outwardly offset portion forming an interior shoulder adapted to support a valve seating plate and its valve mechanism, said casing being provided at the bottom with an inwardly extending flange adapted to be secured to the tank or receptacle and having a portion adapted to support a gauze screen in the lower part of the said casing in position beneath the valve seating plate.

PERCY MATHER.